(12) United States Patent
Arcusin

(10) Patent No.: US 11,843,308 B2
(45) Date of Patent: Dec. 12, 2023

(54) ARRANGEMENT FOR GENERATING ELECTRIC POWER MADE UP OF AT LEAST TWO ROTATING BODIES OF REVOLUTION PARTIALLY IMMERSED IN A DYNAMIC FLUID; AND A PROCEDURE FOR GENERATING ELECTRIC POWER USING SAID ARRANGEMENT

(71) Applicant: Alejandro Román Ganzabal Liberati, Buenos Aires (AR)

(72) Inventor: Carlos Eduardo Arcusin, Buenos Aires (AR)

(73) Assignee: Alejandro Roman Ganzabal Liberati, C.A. de Buenos Aires (AR)

( * ) Notice: Subject to any disclaimer, the term of this patent is extended or adjusted under 35 U.S.C. 154(b) by 27 days.

(21) Appl. No.: 17/775,226

(22) PCT Filed: Nov. 11, 2019

(86) PCT No.: PCT/ES2019/070771
§ 371 (c)(1),
(2) Date: May 6, 2022

(87) PCT Pub. No.: WO2021/094629
PCT Pub. Date: May 20, 2021

(65) Prior Publication Data
US 2022/0385139 A1    Dec. 1, 2022

(51) Int. Cl.
*H02K 7/18* (2006.01)
*F03B 17/06* (2006.01)

(52) U.S. Cl.
CPC ......... *H02K 7/1823* (2013.01); *F03B 17/062* (2013.01)

(58) Field of Classification Search
CPC ... H02K 7/1823; F03B 17/062; F03B 17/063; F05B 2240/91; F05B 2250/02; F05B 2250/231; F05B 2250/41
See application file for complete search history.

(56) References Cited

U.S. PATENT DOCUMENTS 1,368,454 A    2/1921    Rebman

FOREIGN PATENT DOCUMENTS

| CA | 2844362 A1 | 9/2015 | |
| DE | 202019101270 U1 | 3/2019 | |
| WO | 2009135809 A2 | 11/2009 | |
| WO | WO-2014051526 A1 * | 4/2014 | ............. F03B 11/08 |

* cited by examiner

*Primary Examiner* — Joseph Ortega
(74) *Attorney, Agent, or Firm* — Volpe Koenig

(57) ABSTRACT

An arrangement for generating energy made up of at least two rotating bodies of revolution partially immersed in a dynamic fluid. The at least two rotating bodies of revolution have their longitudinal axis of rotation located perpendicularly to the flow of the fluid, and are further associated to support means and to drive means, being immersed about 30% of their diameter. One of the at least two rotating bodies of revolution is located upstream of said dynamic fluid with its longitudinal axis of rotation located in a longitudinal slider of the support means with the possibility of translation and variable rotation speed. The other of the at least two rotating bodies of revolution is located downstream of the dynamic fluid, with its longitudinal axis of rotation being attached to the support means, and with a rotation synchronized with the flow speed of the dynamic fluid.

26 Claims, 3 Drawing Sheets

ARRANGEMENT FOR GENERATING ELECTRIC POWER MADE UP OF AT LEAST TWO ROTATING BODIES OF REVOLUTION PARTIALLY IMMERSED IN A DYNAMIC FLUID; AND A PROCEDURE FOR GENERATING ELECTRIC POWER USING SAID ARRANGEMENT

CROSS REFERENCE TO RELATED APPLICATIONS

The present application is a § 371 National Phase of PCT/ES2019/070771, filed Nov. 11, 2019, which is incorporated by reference herein as if fully set forth.

FIELD OF THE INVENTION

The present invention relates to an arrangement for generating electric power that is made up of at least two rotating bodies of revolution partially immersed in a dynamic fluid; and to a procedure for generating electric power using said arrangement.

BACKGROUND

Few variants of this type of electric power generation are known, specifically, through the exploitation of a dynamic fluid flow such as in, for example, the bed of a river.

The oldest technique is the partially immersed blade windmill, which by the impact of the flow on the front side of the blades obtains a practically continuous rotational movement for its subsequent use through the windmill rotation axis.

In this case, the technique has limitations in terms of the power obtained and the movement continuity.

The other related example is the technique used in hydroelectric power stations where the flow regulated by the dam gates provides movement for the turbines to generate electric power.

In this case, the requirement for costly facilities with large planning and proportions are required, with an important environmental impact due to the modification of watercourses upstream and downstream of the dam. Besides, an important maintenance operation is required.

SUMMARY

This has led the applicant to develop an innovative power source based on the rotation and translation movements, in one or both directions, of a rotating body of revolution located upstream, and also based on the rotation movement of at least one body of revolution located downstream of the arrangement of the invention.

An object of the present invention is an arrangement for generating electric power made up of at least two rotating bodies of revolution, partially immersed in a dynamic fluid, being said arrangement characterized in that:

said at least two rotating bodies of revolution have their longitudinal axis of rotation located perpendicularly to the flow of said fluid, and they are further associated with support means and drive means while having immersed from 25% to 35% of their diameter;

wherein one of said at least two rotating bodies of revolution is located upstream of said dynamic fluid with its longitudinal axis of rotation located in a longitudinal slider of said support means, having possible variable rotation speed and translation; and wherein the other of said at least two rotating bodies of revolution is located downstream of said dynamic fluid with its longitudinal axis of rotation attached to said support means, having a rotation synchronized with the flow speed of said dynamic fluid.

Still another object of the invention is a procedure for generating electric power using the above-mentioned arrangement, wherein said at least two rotating bodies of revolution have a rotation synchronized with the flow speed of said dynamic fluid flow, and wherein the body of revolution located downstream rotates without translation around its longitudinal axis, being the procedure characterized in that the body of revolution located upstream carries out the following steps:

i) rotating around its longitudinal axis while translating upstream of said body of revolution located downstream, being said at least two rotating bodies of revolution initially apart by 5% of their diameters;

ii) stopping when reaching the end of said longitudinal slider furthest from said rotating body of revolution located downstream, by stopping its corresponding said drive means, determining a spacing between said rotating bodies of revolution that is 35% of their diameters;

iii) rotation-less translating downstream towards said rotating body of revolution located downstream until reaching the original spacing of 5% of their diameters; and iv) repeating steps i)-iii) successively.

From the end of the slider that is closest between the rotating bodies of revolution, both of which are rotating at a speed synchronized with the dynamic fluid flow, a hydrodynamic effect causing a distancing of the rotating body of revolution located upstream is generated.

During said distancing, the effect is gradually reduced, and when reaching the end of the slider that is furthermost between the at least two rotating bodies of revolutions, the effect becomes null and, additionally, said drive means stops for interrupting the rotation of said rotating body of revolution located upstream. Guided by said slider, said body of revolution located upstream starts its translation in the opposing direction which, by not rotating, yields maximum resistance, getting closer to the body of revolution located downstream.

It is on this oscillating translation movement, then transformed into rotation, of the body of revolution located upstream, that power is generated.

BRIEF DESCRIPTION OF THE FIGURES

The following detailed description of the preferred embodiment of the present invention will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings.

DETAILED DESCRIPTION OF THE PREFERRED EMBODIMENTS

Figure 1:
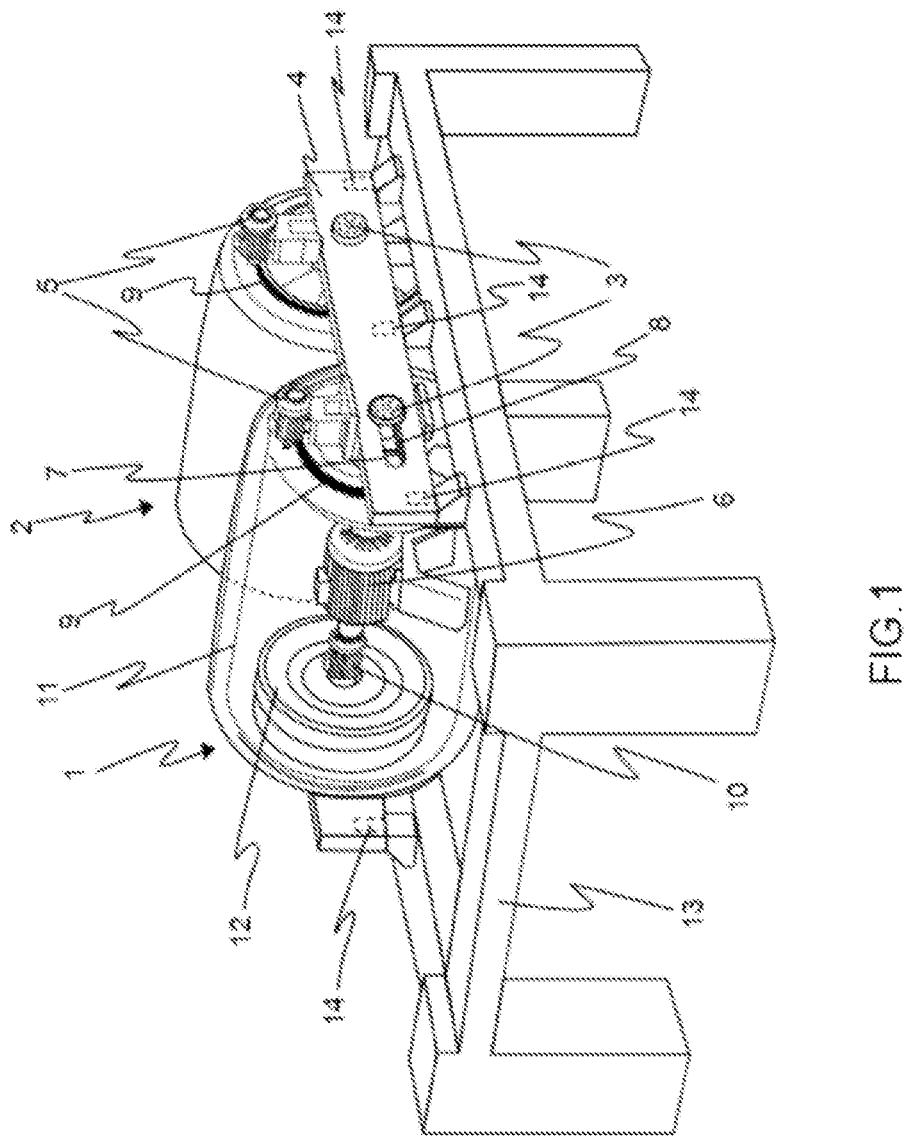
FIG. 1 shows a top perspective view of the arrangement of the invention.

FIG. 1 shows an arrangement for generating electric power made up of at least two rotating bodies of revolution 1,2 partially immersed in a dynamic fluid.

Said at least two rotating bodies of revolution 1,2 have their longitudinal axis of rotation 3 located perpendicularly to the flow of said fluid, and they are further associated to support means 4 and to drive means 5, while being immersed from 25% to 35% of their diameter; wherein one of said at least two rotating bodies of revolution 1 is located upstream of said dynamic fluid and has its longitudinal axis of rotation 3 located in a longitudinal slider 7 of said support means 4, having the possibility of translation and variable rotation speed; and wherein the other of said at least two rotating bodies of revolution 2 is located downstream of said dynamic fluid, and it has its longitudinal axis of rotation 3 attached to said support means 4 and a rotation synchronized with the flow speed of said dynamic fluid.

Said slider 7 has a rack 8 to which the end of said longitudinal axis of rotation 3 of said rotating body of revolution located upstream 1 is associated, defining an oscillating movement wherein the distance of separation between said rotating body of revolution located upstream 1 and said rotating body of revolution located downstream 2 varies from 5% to 35% of the diameter thereof.

The longitudinal axis of rotation 3 of said rotating body of revolution located upstream 1 is connected to said rack 8, for example, through a pinion. Said rack 8 allows the connection of said pinion in one or both directions of the translation.

The above-mentioned drive means 5 propels said at least two rotating bodies of revolution 1,2 in a rotational manner 1,2 by transmission means 9.

Preferably, the drive means 5 is an engine or a plurality of engines.

Preferably, the transmission means 9 are gears, planetary members, pinions, crown gear, or the like.

It should be noted that said at least two rotating bodies of revolution 1,2 have the capacity of over rotation and inverse rotation provided by said drive means 5, and their surface is smooth, textured or with multiple appendices.

Moreover, and preferably, said at least two rotating bodies of revolution 1,2 are cylinders. Each one of said at least two rotating bodies of revolution 1,2 includes within one concentric and static body of revolution 11, which includes means of movement transformation 6 connected to means of power generation 10.

Preferably, the means of movement transformation 6 are multiplier boxes, connecting rod pistons, magnets or the like, said oscillating movement being transformed into mechanical or electrical work or electromotive force.

The concentric and static bodies of revolution 11 previously mentioned can further include within at least an inertia wheel 12 associated to said longitudinal axis of rotation 3.

Additionally, it should be noted that the support means 4 is arranged on a structure 13 that includes the whole said at least two rotating bodies of revolution 1,2. Said structure can be fixed by columns to the bed of the watercourse of said dynamic fluid, or configured to be floating, or it can be a rigid or flexible extension of an additional structure on the coast or river bank of said watercourse.

Said support means 4 is bound to said structure 13 through draft regulating means 14 such that said support means 4 has a height, that can be regulated 13, with respect to said structure. Said draft regulating means 14 are pistons, telescopic columns, or the like. This feature not only allows the draft of said rotating bodies of revolution 1,2 to be regulated during their effective operation, but also facilitates an occasional translation of said structure 13 as a whole, by a minor or inexistent contact between said rotating bodies of revolution 1,2 and said dynamic fluid.

At the end, and facing said rotating body of revolution located upstream 1, a throttling device for said flow of said dynamic fluid can be arranged in order to increase the speed of said flow.

Figure 2:
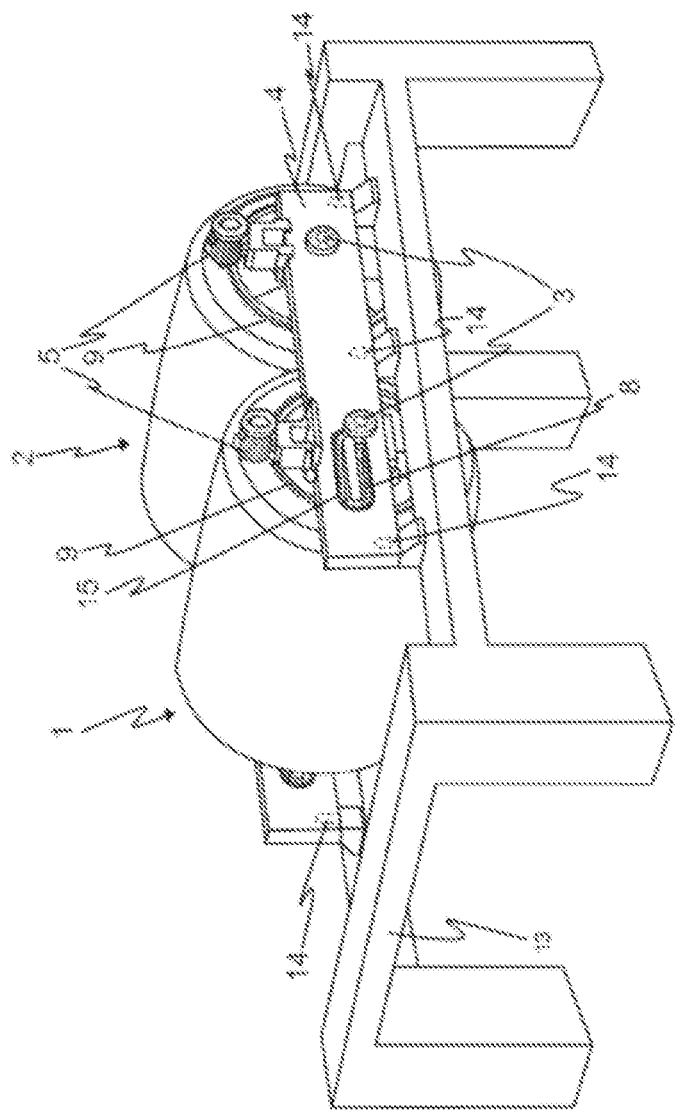
FIG. 2 shows a variant of the arrangement of the invention.

FIG. 2 shows a variant of the arrangement of the invention.

In this variant, the oscillating movement of the rotating body of revolution located upstream 1 is guided by a double band slider 15. This arrangement involves a difference as regards the vertical position of the rotating body of revolution located upstream 1 and, accordingly, of its draft, between the movements performed in both directions. In particular, the upper band of said slider 15 is longitudinally aligned with the axis of said rotating body of revolution located downstream 2.

When reaching the end of the slider 15 that is furthermost from the rotating body of revolution located downstream 2, the same slider 15 guides the rotating body of revolution located upstream 1 towards the lower band, and as its draft thus increases, said body resistance to the dynamic fluid also increases.

Likewise, when reaching the end of the slider 15 closest to the rotating body of revolution located downstream 2, the same slider 15 guides the rotating body of revolution located upstream 1 towards the upper band, restarting the distancing with less resistance being offered.

During the whole oscillating movement, the distancing between the rotating body of revolution located upstream and the rotating body of revolution located downstream oscillates from 5% to 35% of their diameters.

Figure 3:
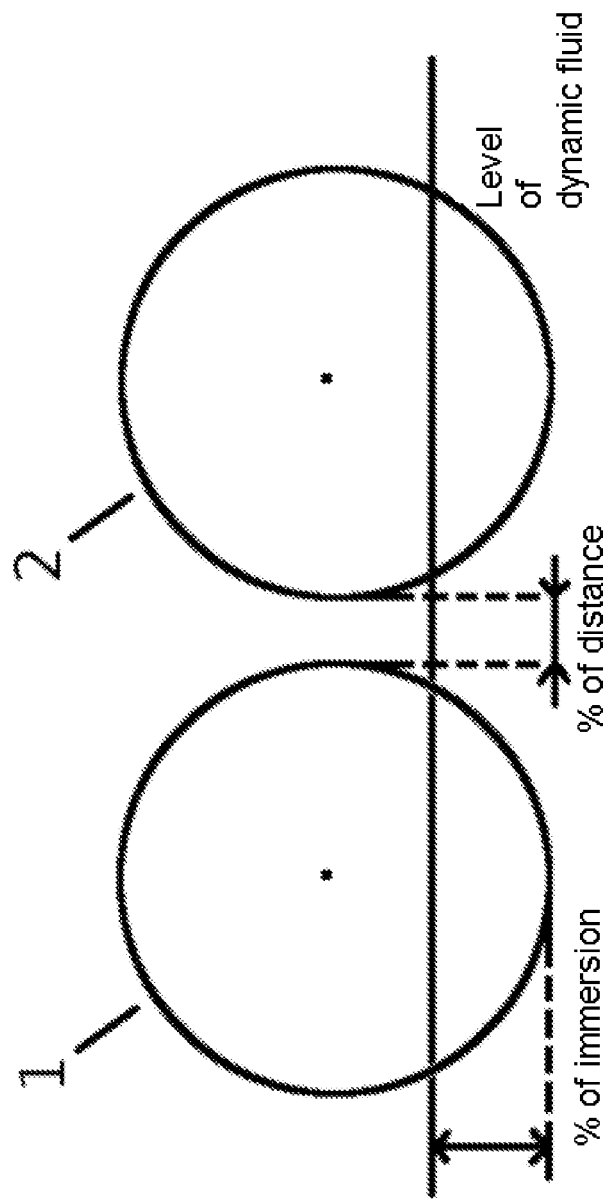
FIG. 3 shows a side view of the arrangement of the invention, in relation to the level of the dynamic fluid in which it is partially immersed.

Finally, FIG. 3 shows a side view of the arrangement of the invention, in relation to the level of the dynamic fluid in which it is partially immersed.

It is understood, therefore, that this invention is not limited to the particular embodiments disclosed, but is intended to cover all modifications which are within the spirit and scope of the invention as defined by the appended claims; the above description; and/or shown in the attached drawings.

The invention claimed is:

1. An arrangement for generating energy comprising at least two rotating bodies of revolution partially immersed in a dynamic fluid, wherein said at least two rotating bodies of revolution have longitudinal axes of rotation located perpendicularly to a flow of said fluid, and are further associated to support means and to drive means, while being immersed from 25% to 35% of diameters thereof;

wherein one of said at least two rotating bodies of revolution are located upstream of said dynamic fluid with a first longitudinal axis of rotation located in a longitudinal runner of said support means with a possibility of translation and variable rotation speed; and wherein the other of said at least two rotating bodies of revolution is located downstream of said dynamic fluid, with a second longitudinal axis of rotation attached to said support means, having a rotation synchronized with the flow speed of said dynamic fluid.

2. The arrangement according to claim 1, wherein said longitudinal slider runner comprises a rack to an end of the first longitudinal axis of rotation of said rotating body of revolution located upstream, defining an oscillating movement wherein a distance of separation between said rotating body of revolution located upstream and said rotating body of revolution located downstream varies from 5% to 35% of the diameter thereof.

3. The arrangement according to claim 2, wherein the first longitudinal axis of rotation of said rotating body of revolution located upstream connects to said rack through a pinion.

4. The arrangement according to claim 3, wherein said rack allows the connection of said pinion in one or both directions of the translation.

5. The arrangement according to claim 1, wherein said drive means propels said at least two rotating bodies of revolution in a rotational manner by transmission means.

6. The arrangement according to claim 5, wherein said drive means are an engine or a plurality of engines.

7. The arrangement according to claim 5, wherein said transmission means are gears, planetary members, pinions, crown gear, or the like.

8. The arrangement according to claim 1, wherein said at least two rotating bodies of revolution are capable of over rotation provided by said drive means.

9. The arrangement according to claim 1, wherein said at least two rotating bodies of revolution are cylinders.

10. The arrangement according to claim 9, wherein surfaces of said at least two rotating bodies of revolution are smooth, textured or with multiple appendices.

11. The arrangement according to claim 1, wherein each one of said at least two rotating bodies of revolution includes within one concentric and static body of revolution.

12. The arrangement according to claim 11, wherein said concentric and static body of revolution of said rotating body of revolution located upstream includes means of movement transformation and means of power generation.

13. The arrangement according to claim 12, wherein said means of movement transformation are multiplier boxes, connecting rod pistons, or magnets, said oscillating movement being transformed into mechanical or electrical work or electromotive force.

14. The arrangement according to claim 12, wherein said means of movement transformation are connected to said means of power generation.

15. The arrangement according to claim 11, wherein said concentric and static bodies of revolution further comprise at least one inertia wheel associated to the longitudinal axis of rotation therein.

16. The arrangement according to claim 1, wherein said support means are arranged on a structure including the whole said at least two rotating bodies of revolution.

17. The arrangement according to claim 16, wherein said structure is fixed by columns to a bed of a watercourse of said dynamic fluid, or configured to be floating, or can be a rigid or flexible extension of an additional structure on a coast or river bank of said watercourse.

18. The arrangement according to claim 16, wherein said support means are bound to said structure through a draft regulating means such that said support means have a height with respect to said structure, that can be regulated.

19. The arrangement according to claim 18, wherein said draft regulating means are pistons or telescopic columns.

20. The arrangement according to claim 1, wherein said longitudinal runner is a double band slider.

21. The arrangement according to claim 20, wherein said double band slider has said rack to which an end of the first longitudinal axis of rotation of said rotating body of revolution located upstream, defining an oscillating movement with vertical displacement in ends thereof, wherein a distance of separation between said rotating body of revolution located upstream and said rotating body of revolution located downstream varies from 5% to 35% of the diameter thereof.

22. The arrangement according to claim 21, wherein the first longitudinal axis of rotation of said rotating body of revolution located upstream is connected to said rack through a pinion.

23. The arrangement according to claim 21, wherein said rack (8) allows connection of said pinion in one or both directions of a translation.

24. A procedure for generating electric power using the arrangement according to claim 20, wherein said at least two rotating bodies of revolution have a rotation synchronized with the flow speed of said dynamic fluid flow, and wherein the body of revolution located downstream rotates without translation around second longitudinal axis, wherein the body of revolution located upstream carries out the following steps:
   i) rotating around first longitudinal axis while translating upstream of said body of revolution located downstream, said at least two rotating bodies of revolution being initially apart by a 5% of their diameters;
   ii) stopping when reaching the furthest end of said longitudinal runner of said rotating body of revolution located downstream, by stopping its corresponding said drive means, determining a spacing between said rotating bodies of revolution of up to 35% of their diameters;
   iii) descending towards the lower band of said double band slider in order to perform downstream rotationless translation towards said rotating body of revolution located downstream until reaching the original spacing of 5% of their diameters; and
   iv) repeating steps i)-iii) successively.

25. The arrangement according to claim 1, wherein, facing said rotating body of revolution located upstream, a throttling device for said flow of said dynamic fluid that increases the speed of said flow is arranged.

26. A procedure for generating electric power using the arrangement according to claim 1, wherein said at least two rotating bodies of revolution have a rotation synchronized with the flow speed of said dynamic fluid flow, and wherein the body of revolution located downstream rotates without translation around the second longitudinal axis, wherein the body of revolution located upstream carries out the following steps:
   i) rotating around second longitudinal axis while translating upstream from said body of revolution located downstream being said at least two rotating bodies of revolution initially apart by 5% of their diameters;
   ii) stopping when reaching the furthest end of said longitudinal runner of said rotating body of revolution located downstream, by stopping its corresponding said drive means, determining a spacing between said rotating bodies of revolution of up to 35% of their diameters;
   iii) translating, without rotating, downstream towards said rotating body of revolution located downstream until reaching the original spacing of 5% of their diameters; and
   iv) repeating steps i)-iii) successively.

* * * * *